(12) United States Patent
Alabdeen (10) Patent No.: US 8,395,662 B1
(45) Date of Patent: Mar. 12, 2013

(54) AVIATION EMERGENCY RESPONSE SYSTEM

(76) Inventor: Adel Jumah Alabdeen, Fahad Al-Alhmad (KW)

( * ) Notice: Subject to any disclaimer, the term of this patent is extended or adjusted under 35 U.S.C. 154(b) by 0 days.

(21) Appl. No.: 13/587,147

(22) Filed: Aug. 16, 2012

Related U.S. Application Data (63) Continuation of application No. 13/311,455, filed on Dec. 5, 2011.

(51) Int. Cl.
*G09B 9/00* (2006.01)
(52) U.S. Cl. .......................... 348/123; 348/117
(58) Field of Classification Search .................. None
See application file for complete search history.

(56) References Cited

U.S. PATENT DOCUMENTS

| | | | |
|---|---|---|---|
| 6,211,809 B1* | 4/2001 | Stiles | 342/33 |
| 2002/0093564 A1* | 7/2002 | Israel | 348/145 |
| 2003/0090382 A1* | 5/2003 | Shear | 340/574 |
| 2006/0088380 A1* | 4/2006 | Prevost | 404/75 |
| 2007/0200008 A1* | 8/2007 | Rastegar et al. | 239/201 |
| 2008/0032069 A1* | 2/2008 | Carr et al. | 428/17 |
| 2011/0033233 A1* | 2/2011 | D'Almeida | 404/6 |
| 2011/0063445 A1* | 3/2011 | Chew | 348/159 |

FOREIGN PATENT DOCUMENTS

CN 101435191 A * 5/2009

OTHER PUBLICATIONS

Prior art cited in parent U.S. Appl. No. 13/311,455, filed Dec. 5, 2011, the priority of which is claimed herein.

* cited by examiner

*Primary Examiner* — Sath V Perungavoor
*Assistant Examiner* — Kate Luo
(74) *Attorney, Agent, or Firm* — Richard C. Litman (57) ABSTRACT

The aviation emergency response system includes a number of ground subsystems located on an airport, and a number of subsystems installed in an aircraft. The ground subsystems may include dispensers along the edges of the runway(s) for dispensing foam, water, and/or deicing fluid, and an array of cameras installed along the runway edges. Low lateral retaining dams may be provided along the edges of the runway(s), and appropriate drainage is also provided for the runway. A tire-puncturing apparatus may also be installed in the surface of the runway, and energy-absorbing overruns are provided at the runway ends. A control center including appropriate monitoring and control systems is also provided on the airport. Aircraft may be equipped with external cameras for monitoring the condition of the aircraft in flight, and corresponding annunciator systems placed in the aircraft cockpit for appropriate response(s) by the flight crew.

3 Claims, 7 Drawing Sheets

AVIATION EMERGENCY RESPONSE SYSTEM

CROSS-REFERENCE TO RELATED APPLICATIONS

This is a continuation of my prior application Ser. No. 12/311,455, filed Dec. 5, 2011 now pending.

BACKGROUND OF THE INVENTION

1. Field of the Invention

The present invention relates to systems for handling aviation disasters, and particularly to an aviation emergency response system for aircraft in distress.

2. Description of the Related Art

It is an unfortunate fact that no transportation system is perfectly safe. Anytime there is moving machinery, there is some chance for an accident. Transportation accidents receive the greatest notice in the field of aviation, partly because such accidents have become relatively uncommon due to the significant advances in safety that have been developed over the years. Another reason for the attention that aviation accidents receive is their relative severity. Generally speaking, aviation accidents tend to be considerably more catastrophic than other transportation accidents due to the large number of passengers carried on larger airline aircraft, and also due to the speed at which such aircraft fly.

As a result, a number of systems have been developed in the past to enhance aviation safety. These various systems, along with the intensive training of airline crews, have created an aviation system in which most accidents are the result of rare mechanical failure, or weather or other natural cause, rather than pilot error. Nevertheless, the occasional airline accident still occurs from time to time.

While it may not be possible to completely prevent certain accidents from occurring, e.g., mechanical failures, bird strikes, etc., there are many things that might be done to reduce the severity of such accidents when they do occur and/or to provide more notice to flight crews and ground personnel when an emergency is imminent. For example, all airports having scheduled airline service are required to have firefighting equipment available. The degree of firefighting capability depends upon the size of the airline aircraft and the number of flights per day. Additional equipment for deicing runways and aircraft is also common at airports where weather conditions are conducive to icing during colder times of the year. However, these systems are mobile and generally cannot cover a large area, at least not at any given moment. Moreover, there are instances in which some problem develops on an aircraft and the flight crew is either unaware of the problem or cannot determine the exact nature of the problem in order to take the proper corrective action, as they cannot readily view the portion of the aircraft having the problem.

Thus, an aviation emergency response system solving the aforementioned problems is desired.

SUMMARY OF THE INVENTION

The aviation emergency response system comprises a number of different ground-based and aircraft-based subsystems that each provide an increase in safety for aircraft. Many of the systems interface with one another to provide authorities with accurate information as to the nature of an emergency or problem, and to enable those authorities to make the proper response.

One such subsystem comprises a plurality of retractable, remotely controlled fluid dispensers disposed along the edges of a runway for dispensing water, fire retardant foam, and/or deicing chemicals on the runway when required. A plurality of cameras may also be provided along the sides of the runway to enable authorities to accurately direct any response to an emergency that may occur on the runway. The runway may also include electrically resistant heating elements therein to melt ice, and/or devices to puncture the tires of an aircraft should such action become necessary. The runway preferably includes an energy-absorbent overrun area at each end. Appropriate dams or berms along the edges of the runway may also be provided for the retention of beneficial liquids thereon, and/or the runway may include appropriate drainage for the rapid removal of water and snowmelt therefrom. The various runway subsystems may be controlled from a central control position on the airport, allowing authorities to monitor the various subsystems and the condition of the runway at all times.

Aircraft, and particularly airline aircraft, may also be equipped with various subsystems to address and respond to various in-flight emergencies. A plurality of external cameras may be provided on the aircraft to allow the flight crew to view substantially the entire exterior of the aircraft to monitor its condition for icing, structural damage, etc. The video output of any or all of the cameras may be transmitted to the cockpit for viewing by the flight crew, and/or may be transmitted to one or more ground stations for structural experts or others to view, as appropriate. Various additional monitors and controls may be provided for the flight crew to respond to a given situation and/or to communicate with ground-based authorities to the extent necessary to meet the emergency.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The aviation emergency response system comprises multiple ground-based and aircraft-based subsystems serving to increase aviation safety and/or to reduce the severity of aircraft accidents or incidents. The various subsystems communicate with a control facility or station that, in turn, monitors the subsystems. Personnel in the control station respond with appropriate actions as required to meet an emergency situation as it arises and develops. The aircraft-based subsystems also communicate with the ground-based control station, and also with a cockpit annunciator and monitor.

Figure 1:
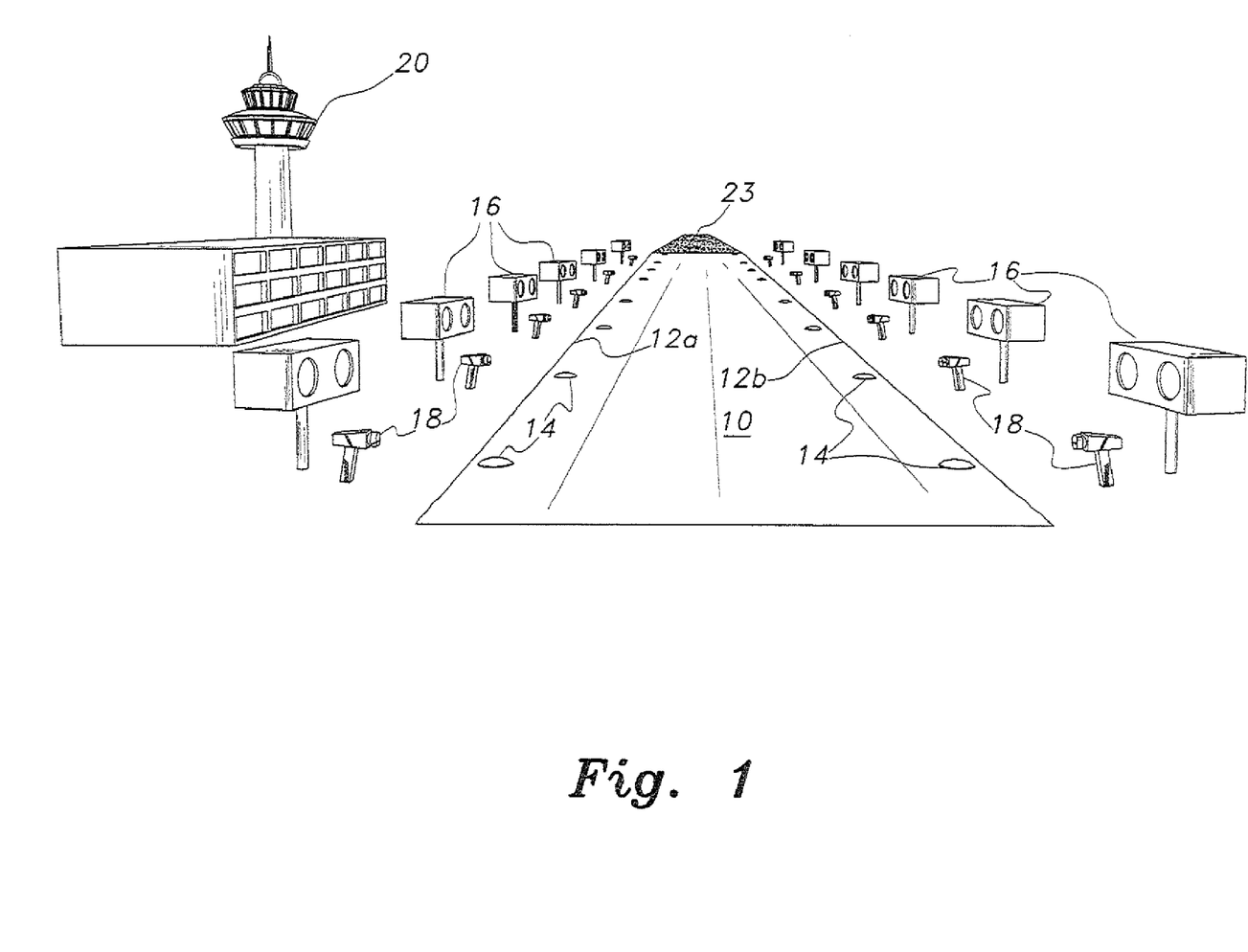
FIG. 1 is a perspective view of an airport runway incorporating components of the aviation emergency response system according to the present invention.
Figure 2:
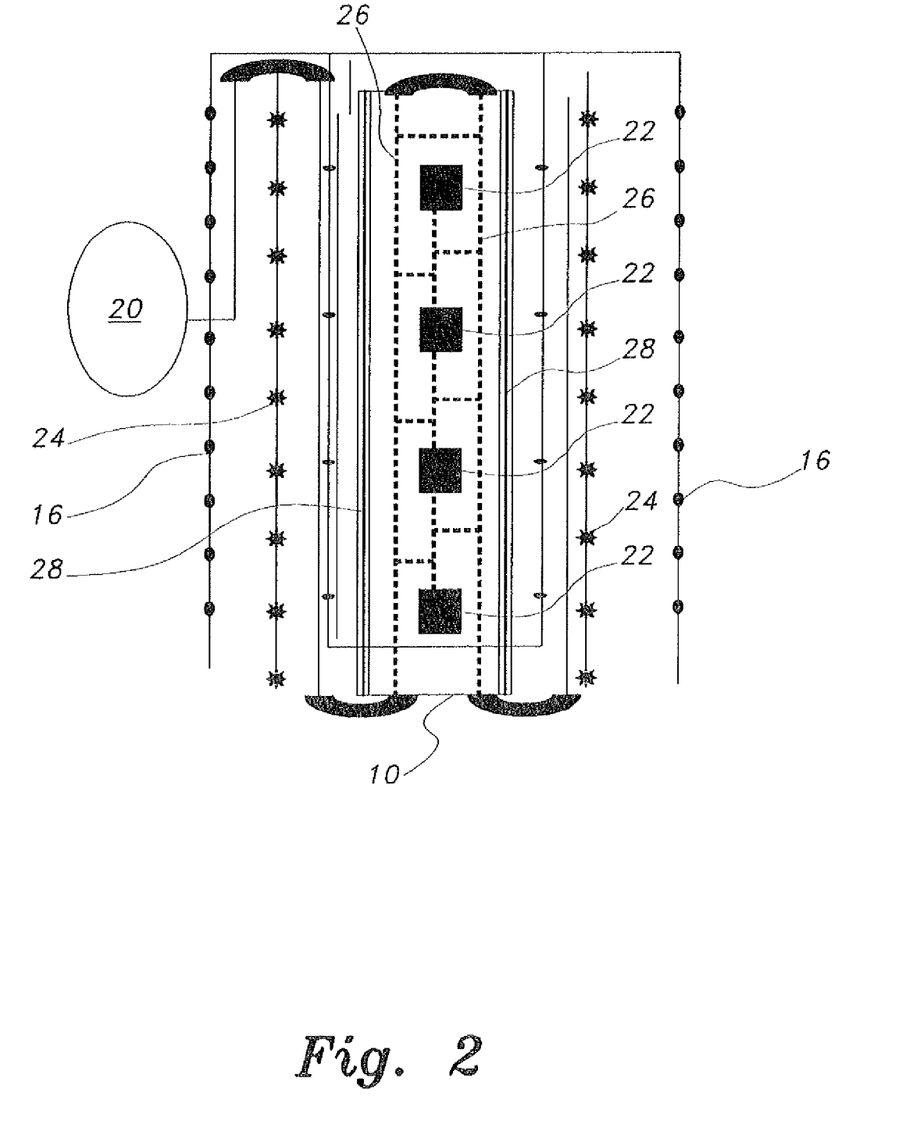
FIG. 2 is a schematic plan view of a runway layout depicting the various camera and water/chemical dispensing stations along the runway of the aviation emergency response system according to the present invention.
Figure 3:
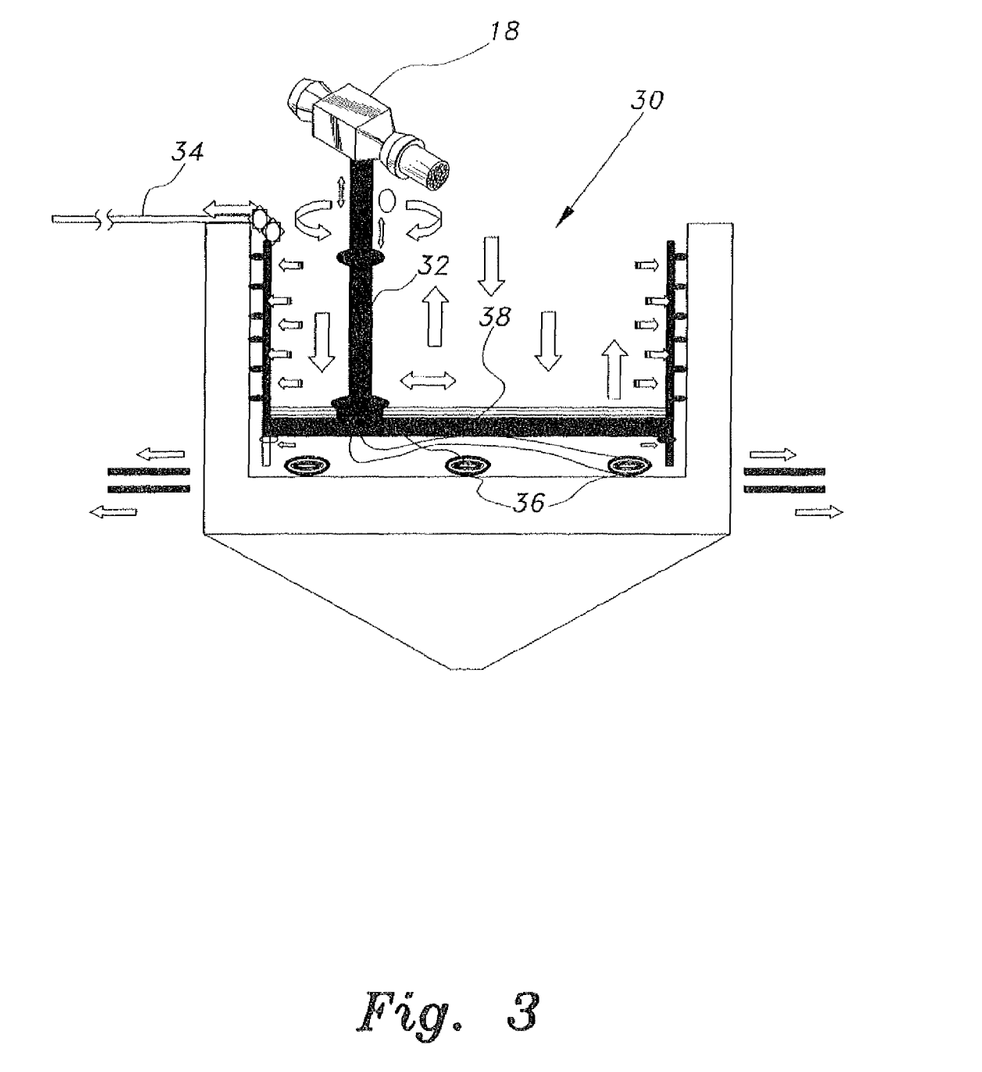
FIG. 3 is a diagrammatic side view in section of a single water/chemical dispensing unit of the aviation emergency response system according to the present invention.

FIG. 1 of the drawings provides a perspective view of an exemplary airport runway 10 equipped with a number of the subsystems of the aviation emergency response system. FIG. 2 provides a schematic plan view of the runway 10 of FIG. 1. The runway 10 includes mutually opposed lateral edges 12a and 12b. Each edge 12a, 12b has a plurality of runway monitoring cameras 14 embedded in the runway adjacent to the respective edge, the cameras 14 having transparent protective lenses flush with the runway surface. Additional above-surface runway monitoring cameras 16 are provided adjacent each runway edge 12a and 12b and outboard thereof to provide a different visual perspective from the view provided by the surface cameras 14. A plurality of selectively retractable and extendable runway fluid dispensers 18 are installed along the runway edges 12a and 12b outward of the runway 10 proper. These dispensers 18 are remotely controlled to extend and articulate on command. FIG. 3 provides a detailed view of the operational mechanism of one of the dispensers 18, details of which are described further below. The fluid output of the dispensers 18 may be selected to provide water, fire retardant foam, or deicing fluid, as desired. Additional sprinklers or fluid dispensers may be set into the runway 10 and flush with the surface.

A control station 20 communicates with the various cameras 14 and 16 to monitor the video output of those cameras. Operators and/or authorities in the control station 20 may control the extension, directional aim, fluid output, and retraction of the fluid dispensers 18. The control station 20 may be located physically with the same structure as the conventional control tower provided at airports having sufficient air traffic to require such a tower, or may be located at some other area on or off the airport, as the monitoring of and control of the various systems on the airport is accomplished remotely.

FIG. 2 of the drawings provides a schematic plan view of many of the features shown in FIG. 1, and some additional features. The runway 10 includes a series of tire puncturing devices 22 embedded in the runway. An exemplary tire puncturing apparatus or device 22 is illustrated in detail in FIG. 4 and discussed in detail further below. Additional means for stopping an aircraft that rolls off the end of the runway is provided by a runway overrun area 23 formed of coarse asphalt or other suitable material, as shown in FIG. 1. FIG. 2 also illustrates the control center or station 20 and its communication with other components or subsystems, e.g., the connections and ductwork 26 for electrical communications, fluid supply, and drainage, cameras 14 and/or 16, etc. FIG. 2 also schematically illustrates the selectively extendible and retractable low dams or berms 28 installed along the edges of the runway 10. These low dams may be selectively extended to a height of about thirty centimeters/twelve inches, more or less, and serve to contain firefighting foam or other fluid on the runway 10. Their operation is also controlled from the control station 20, as in the case of most of the other subsystems.

FIG. 3 of the drawings provides an elevation view through the belowground receptacle 30 containing one of the fluid dispensers 18. Each of the dispensers 18 is selectively retractable and extendible upon its vertical column 32. A sliding hatch 34 selectively covers the receptacle 30 when the dispenser 18 is retracted. Conventional electrical or other controls 36 may be provided for control of each of the dispensers 18, and appropriate ducting 38 provides delivery of the fluid(s).

Figure 4:
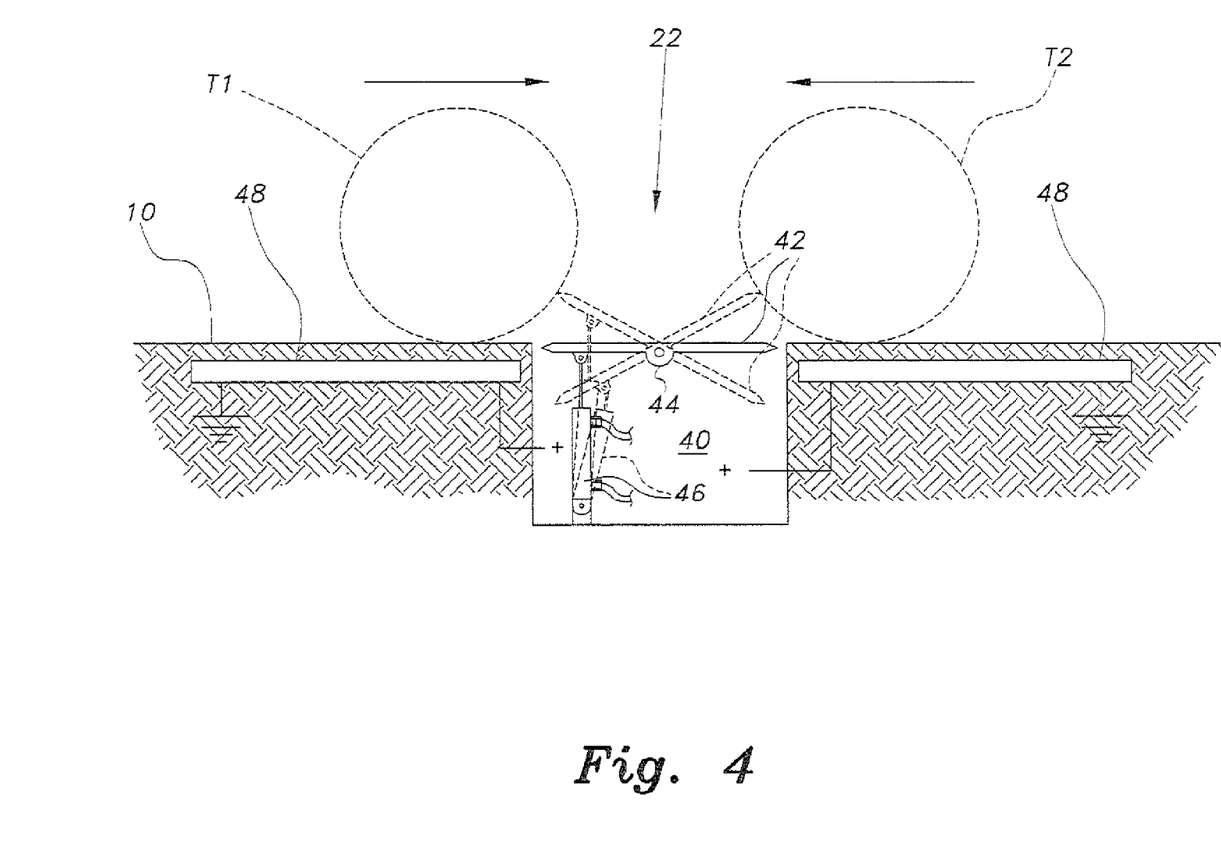
FIG. 4 is a side elevation in section of a tire puncturing apparatus that may be installed in a runway in accordance with the aviation emergency response system according to the present invention.

FIG. 4 provides a detailed elevation view through one of the below-runway receptacles 40 containing one of the tire-puncturing devices or apparatus 22. The apparatus 22 is installed in a receptacle 40 placed in the runway 10. The laterally symmetrical tire puncturing spears 42 pivot on a pivot 44 set substantially flush with the surface of the runway 10. When the spears 42 are horizontal, aircraft tires T1 and T2 can roll over the spears with no damage to the tires. However, if it is decided to deploy the spears 42, they may be tilted or pivoted so that either end extends upward from the receptacle 40. Actuation may be by means of a hydraulic or pneumatic cylinder(s), 46, electric actuators, mechanical actuators driven by hydraulic, electric, or pneumatic means, etc.

FIG. 4 also illustrates the heating elements 48 that may be installed immediately below the surface of the runway. The heating elements 48 comprise electrically resistive plates embedded beneath the surface of the runway. The heating elements may be controlled from the control station 20 shown in FIG. 1, or may be actuated automatically by means of conventional temperature and moisture sensors.

Figure 5:
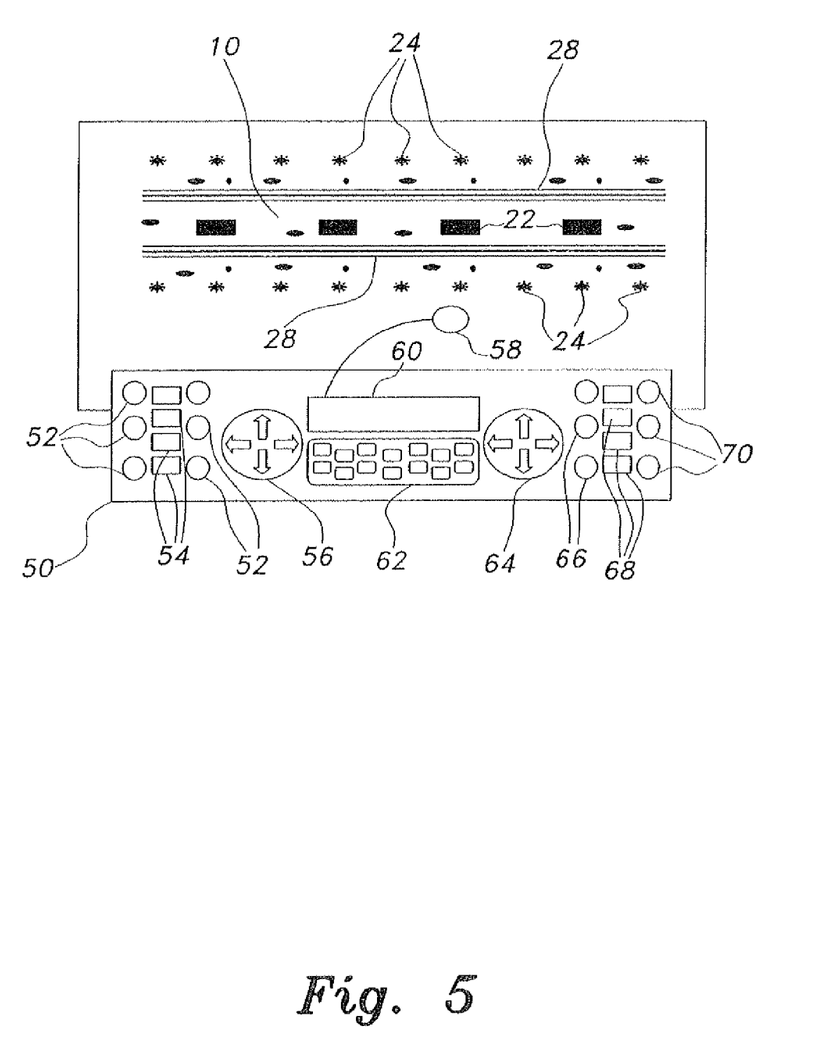
FIG. 5 is a diagrammatic front view of a control panel that may be included within the control station of the aviation emergency response system according to the present invention.

FIG. 5 provides a general plan view of an exemplary control panel 50 for controlling the functions of the various camera, lighting, and other devices associated with the runway 10. The runway 10 and many of the devices installed therewith also illustrated in the background of FIG. 5. The control panel 50 is physically located within the control station 20, shown in FIG. 1 of the drawings. The control panel 50 includes a plurality of camera controls 52, camera panning being controlled by a separate control 56. Controls 54 are provided for the tire-puncturing devices, e.g., the apparatus 22 shown in detail in FIG. 4. A microphone 58 and transceiver are provided for communications with aircraft, ground vehicles and personnel, etc. An annunciator panel 60 provides an audible or visual alert of adverse or emergency conditions on or adjacent to the runway 10, as detected by the camera array 14 and 18 of FIG. 1. Controls 66 and 70 provide for control of the fluid dispensers, e.g., the fluid dispenser 18 illustrated in detail in FIG. 3, elevation and azimuth control of the dispensers 18 being provided by control 64. Finally, lighting is controlled by the control array 68. It will be understood that the specific functions described for the panel 50 are exemplary, and the various controls of the panel 50 may be connected and/or arranged in any other desired pattern or array.

Figure 6:
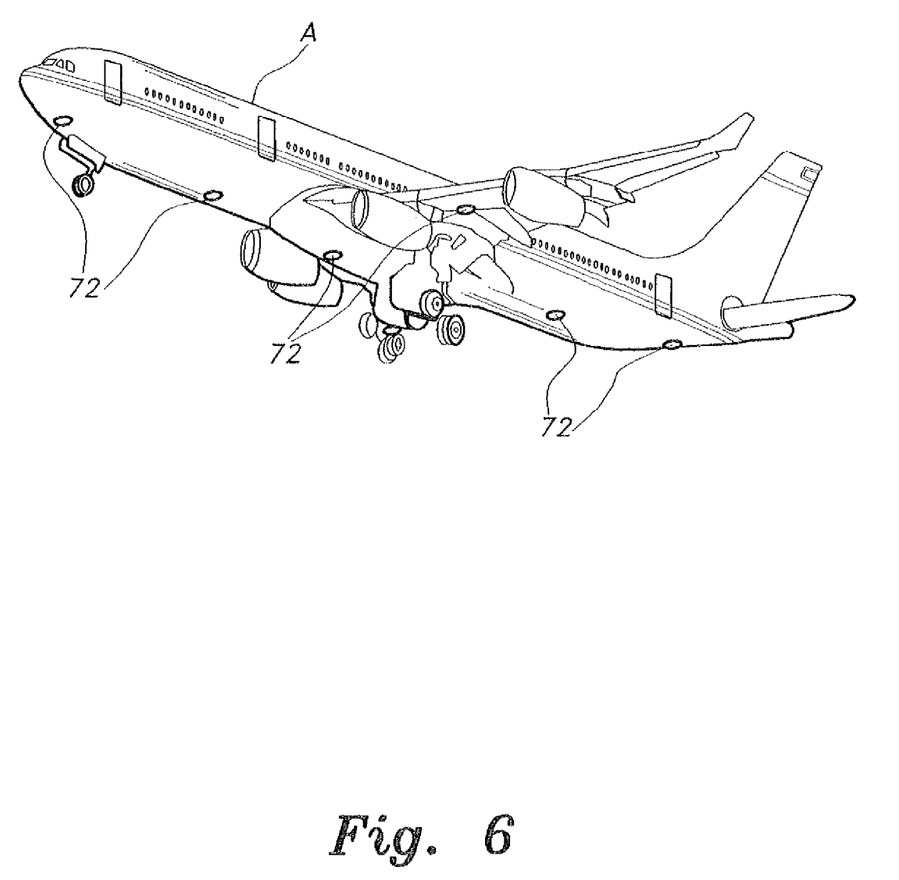
FIG. 6 is a perspective view of an exemplary airline aircraft incorporating external cameras in accordance with the aviation emergency response system according to the present invention.
Figure 7:
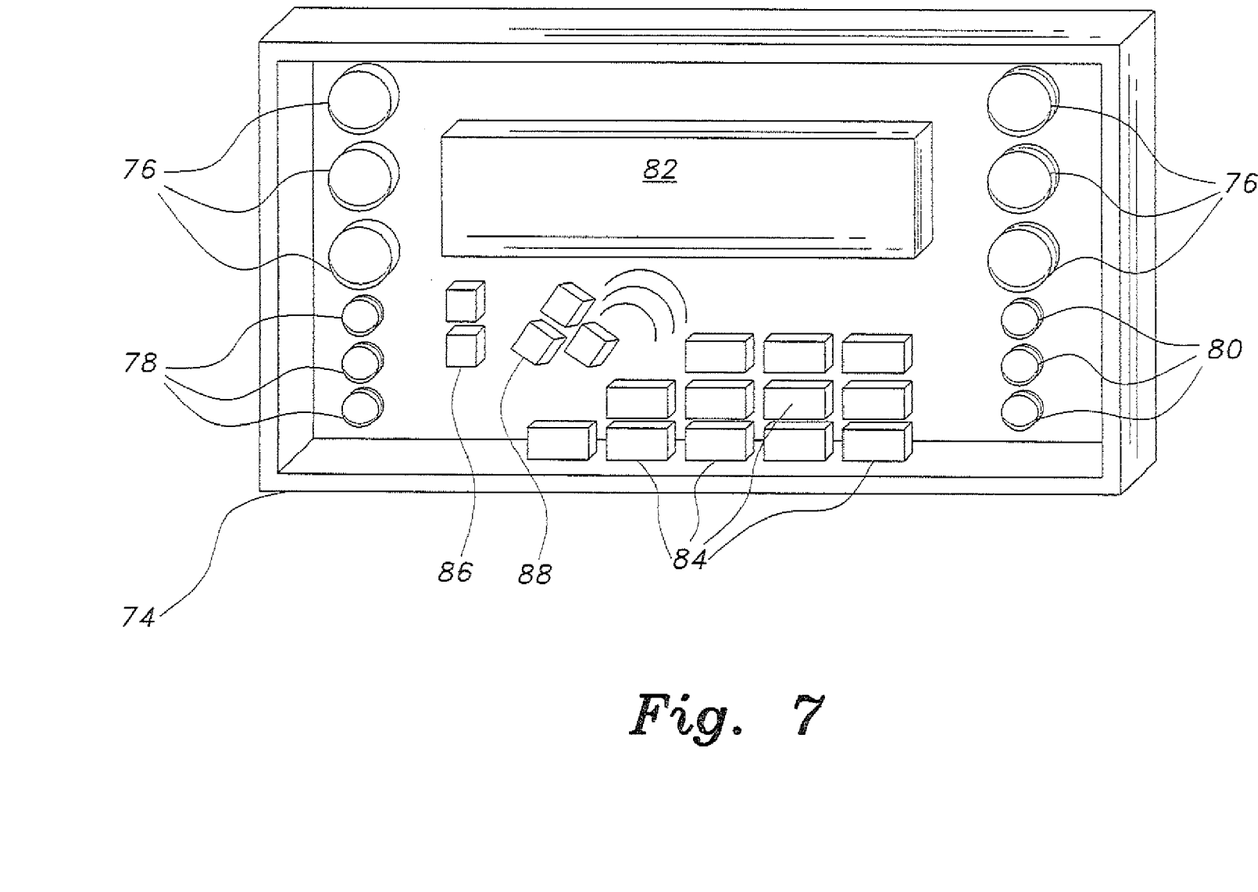
FIG. 7 is a perspective view of a control panel that may be incorporated in an aircraft in accordance with the aviation emergency response system according to the present invention.

FIG. 6 provides an illustration of an exemplary commercial airline aircraft A equipped with a plurality of external cameras 72. The cameras 72 allow the flight crew to view virtually all of the external aircraft structure in flight by means of the video output of the cameras, including areas beneath the aircraft that are ordinarily not visible to the flight crew in flight. The aircraft A further includes a combination monitor and annunciator panel 74 installed in the cockpit. The primary purpose of the panel 74 is to allow the flight crew to view the video output of the external cameras 72 on the monitor screen 82 of the panel 74. The panel 74 includes a number of additional functions, e.g., audio and visual annunciator controls 76, on/off and programming controls 78, camera controls 80, database selector controls 84, day and date input controls 86, and clock function controls 88. These various controls and displays are exemplary, and may be altered or reduced depending upon other avionics and instruments provided in the aircraft, e.g., GPS navigational systems that already contain airport location databases and time functions, etc. The airborne system comprising cameras 72 (FIG. 6) and annunciator/monitor panel 74 (FIG. 7) communicates with the annunciator, monitor, and control panel 50 (FIG. 5) installed in the control station 20 (FIG. 1) to provide authorities with sufficient information as to the status of the aircraft A to enable the authorities to take appropriate action on the ground, e.g., operating the fluid dispensing units 18 along the runway 10, etc., as required.

It is to be understood that the present invention is not limited to the embodiments described above, but encompasses any and all embodiments within the scope of the following claims.

I claim:

1. An aviation emergency response system, comprising:
    a plurality of retractable runway fluid dispensers for selectively dispensing water, fire retardant foam, and deicing fluid on a runway, wherein the plurality of dispensers are spaced along the lateral edges of the runway;
    a plurality of electrically resistive subsurface runway heating elements;
    mutually opposed first and second runway edge fluid retaining dams;
    a control station for selectively controlling the runway fluid dispensers and the runway heating elements;
    a first plurality of remotely controlled runway monitoring cameras selectively providing a video output, the control station selectively monitoring the video output of the first runway monitoring cameras, wherein the first plurality of monitoring cameras are embedded in the lateral edges of the runway;
    a second plurality of remotely controlled runway monitoring cameras selectively providing a video output, the control station selectively monitoring the video output of the second runway monitoring cameras, wherein the second plurality of monitoring cameras are disposed above the lateral edges of the runway and laterally spaced from the first plurality of monitoring cameras;
    an annunciator system disposed with the control station, the annunciator system being adapted to provide warnings of emergency conditions detected by the runway monitoring cameras; and
    an aircraft tire-puncturing apparatus adapted for installation in a runway and for selective deployment, the aircraft tire-puncturing apparatus having a plurality of laterally symmetrical spears extending therefrom, the spears being selectively deployed in a first direction and a second direction opposite the first direction.

2. The emergency runway system for aircraft according to claim 1, further comprising at least one runway end overrun area, the overrun area comprising coarse asphalt.

3. The emergency runway system for aircraft according to claim 1, further comprising a plurality of external airframe cameras adapted for viewing an external aircraft structure and for providing a video output thereof.

* * * * *